(12) United States Patent
Naito

(10) Patent No.: US 9,606,270 B2
(45) Date of Patent: Mar. 28, 2017

(54) OPTICAL SHEET ROLL AND METHOD FOR MANUFACTURING OPTICAL SHEET ROLL, OPTICAL SHEET, AND DISPLAY DEVICE

(75) Inventor: Nobuo Naito, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 790 days.

(21) Appl. No.: 13/511,899

(22) PCT Filed: Dec. 3, 2010

(86) PCT No.: PCT/JP2010/071714
§ 371 (c)(1),
(2), (4) Date: May 24, 2012

(87) PCT Pub. No.: WO2011/068212
PCT Pub. Date: Jun. 9, 2011

(65) Prior Publication Data
US 2012/0243098 A1    Sep. 27, 2012

(30) Foreign Application Priority Data

Dec. 3, 2009 (JP) .................................. 2009-275526

(51) Int. Cl.
*G02B 5/00* (2006.01)
*G02B 27/00* (2006.01)

(52) U.S. Cl.
CPC ......... *G02B 5/003* (2013.01); *G02B 27/0018* (2013.01)

(58) Field of Classification Search
CPC ......... G02B 5/02–5/0294; G02B 5/003; G02B 5/22–5/24; G02B 27/0018; G02F 1/1335–1/133555; G02F 2201/08–2201/086

USPC .............................. 359/599–615; 264/1.1–2.7
See application file for complete search history.

(56) References Cited

U.S. PATENT DOCUMENTS

| | | | | |
|---|---|---|---|---|
| 6,322,236 B1* | 11/2001 | Campbell | ................ | G02B 5/00 362/19 |
| 6,700,716 B2* | 3/2004 | Sejkora | .................... | F21V 5/02 216/24 |
| 8,120,864 B2* | 2/2012 | Lee | ........................ | G02B 5/208 359/614 |

(Continued)

FOREIGN PATENT DOCUMENTS

| EP | 1 286 203 A2 | 2/2003 |
|---|---|---|
| JP | 3-182701 A | 8/1991 |

(Continued)

OTHER PUBLICATIONS

Machine Translation of JP2003-066206A.*
International Search Report: mailed Dec. 28, 2010; PCT/JP2010/071714.

Primary Examiner — Bumsuk Won
Assistant Examiner — Jeffrey Madonna
(74) Attorney, Agent, or Firm — Ladas & Parry LLP

(57) ABSTRACT

The disclosure provides an optical sheet roll which enables improvement of yield by reducing the parts that are not usable as an optical sheet when cutting out an optical sheet in an adequate size. Also disclosed is a method for manufacturing the optical sheet roll; a method for manufacturing an optical sheet using the optical sheet roll; and a method for manufacturing a display device using the optical sheet roll.

5 Claims, 13 Drawing Sheets

(56) References Cited

U.S. PATENT DOCUMENTS

| | | | |
|---|---|---|---|
| 2001/0053029 A1* | 12/2001 | Umemoto | G02B 5/045 359/599 |
| 2004/0234188 A1* | 11/2004 | Kerr | B29C 43/222 385/14 |
| 2006/0145578 A1 | 7/2006 | Park et al. | |
| 2006/0227427 A1 | 10/2006 | Dolgoff | |
| 2006/0250064 A1* | 11/2006 | Park et al. | 313/112 |
| 2008/0084681 A1* | 4/2008 | Naito | H05K 9/0096 361/818 |
| 2009/0059379 A1* | 3/2009 | Lim | G02B 5/003 359/614 |
| 2010/0033827 A1* | 2/2010 | Foley | G02B 5/045 359/614 |
| 2011/0149177 A1* | 6/2011 | Takata | B29D 11/00278 348/790 |

FOREIGN PATENT DOCUMENTS

| | | |
|---|---|---|
| JP | 2003-057635 A | 2/2003 |
| JP | 2003-066206 A | 3/2003 |
| JP | 2006-189867 A | 7/2006 |
| JP | 2007-508573 A | 4/2007 |
| JP | 2009-086682 A | 4/2009 |
| WO | 2009028226 A1 | 3/2009 |
| WO | 2009/066474 A1 | 5/2009 |

\* cited by examiner

OPTICAL SHEET ROLL AND METHOD FOR MANUFACTURING OPTICAL SHEET ROLL, OPTICAL SHEET, AND DISPLAY DEVICE

TECHNICAL FIELD

The present invention relates to: an optical sheet roll formed by rolling up a belt-like optical sheet; a method for manufacturing the optical sheet roll; a method for manufacturing an optical sheet using the optical sheet roll; and a method for manufacturing a display device using the optical sheet roll.

BACKGROUND ART

An image display device that outputs an image to an observer, such as a liquid crystal display, plasma display, rear-projection display, organic EL, and FED, is provided with an image source and an optical sheet comprising layers with various functions for improving the quality of the image light emitted from the image source to output the image to the observer.

Heretofore, there have been disclosed several techniques related to such an optical sheet, one of which is disclosed in Patent Document 1 for example. Patent Document 1 discloses a two-dimensional viewing angle enlarging member (being equivalent to the "optical sheet" of the present application) comprising a base film which transmits light and has flat surfaces on both sides, wherein two light-diffusing sheets having a plurality of unit lenses with a substantially trapezoidal cross section formed in a one-dimensional or two-dimensional direction (the light-diffusing sheet being equivalent to an "optical functional layer" of the present application), are adhered to both surfaces of the base film in a manner sandwiching the base film with the phases of the sheets shifted by about 90; in each of the light-diffusing sheets, the unit lens in its trapezoidal shape has a light input part on the lower base, a light output part on the upper base, and a total reflection part on the oblique line; the unit lens is formed of a high-refractive index substance; the triangular cross section part sandwiched by the adjacent unit lenses is formed of a low-refractive index substance having a refractive index lower than that of the high-refractive index substance; and light-absorbing particles are added to the low-refractive index substance. In addition, Patent Document 1 also discloses a method for manufacturing a light-diffusing sheet.

CITATION LIST

Patent Literatures

Patent Document 1: Japanese Patent Application Laid-Open No. 2009-086682

SUMMARY OF THE INVENTION

Problems to be Solved by the Invention

As disclosed in the above Patent Document 1, in a conventional optical functional layer (light-diffusing sheet), a mold roll having a mold parallel or orthogonal to its circumferential direction formed on its outer circumferential surface (see FIG. 12 in Patent Document 1) is used to form a light-transmissive portion (unit lens) having a shape corresponding to the shape of the mold. FIG. 7 will be used to describe the method for manufacturing the conventional optical functional layer, that is, a method for forming a light-transmissive portion by using a mold roll having a mold parallel to its circumferential direction formed on its outer circumferential surface. FIG. 7 is a view illustrating a method of forming a light-transmissive portion provided to the conventional optical functional layer.

As shown in FIG. 7, a method is as follows of forming light-transmissive portions 211, 211, . . . , by using a mold roll 220 in which recess portions 221, 221, . . . , and protrusion portions 222, 222, . . . formed between the recess portions 221, 221, . . . are formed on its outer circumferential surface along its circumferential direction. First, while a resin to constitute the light-transmissive portions 211, 211, . . . is supplied in between the mold roll 220 and a base material 230 provided in a direction shown by Arrow Y, the mold roll 220 is rotated on the base material 230. Then while filling the resin to constitute the light-transmissive portions 211, 211, . . . in between the mold roll 220 and the base material 230, the resin is cured. Thereby, the light-transmissive portions 211, 211, . . . having a shape corresponding to the shape of the recess portions 221, 221, . . . , and grooves 212, 212, . . . having a shape corresponding to the shape of the protrusion portions 222, 222, . . . are formed; and a belt-like optical sheet 240' can be obtained. At this point, the recess portions 221, 221, . . . and the protrusion portions 222, 222, . . . are formed along the circumferential direction of the mold roll 220. As such, the light-transmissive portions 211, 211, . . . and the grooves 212, 212, . . . are arranged in a row in a manner that the longitudinal directions thereof are parallel to the longitudinal direction of the belt-like optical sheet 240' (a direction shown byArrow Y in FIG. 7). After obtaining the belt-like optical sheet 240' in this way, optical sheets 250, 250, . . . in an adequate size can be cut out from the belt-like optical sheet 240 having light-absorbing portions 213, 213, . . . formed in the grooves 212, 212, . . . , as shown in FIG. 8 (a plan view schematically showing a manner in which the optical sheets 250, 250, . . . are cut out from a part of the belt-like optical sheet 240).

When an optical sheet is attached to an image source, it is sometimes disposed in such a manner that the longitudinal direction of the light-absorbing portion is oblique with respect to the horizontal face, as will be described below. When cutting out from the belt-like optical sheet 240 thus manufactured, the optical sheets 250, 250, . . . comprising the light-absorbing portions 213, 213, . . . whose longitudinal direction is oblique with respect to the horizontal face at a time when the optical sheet is attached to the image source, it is necessary to cut the optical sheets 250, 250, . . . obliquely with respect to the longitudinal direction of the belt-like optical sheet 240, as shown in FIG. 8. Thus, there are many parts of the belt-like optical sheet 240 that are not usable as the optical sheets 250, 250, . . . , causing degradation of material yield and increase in costs. Further, in a case of adhering the optical sheet of the present invention to another functional sheet, if they are adhered continuously in a roll-to-roll way, thereafter cutting out the optical sheet of the present invention (the "roll-to-roll" meaning that a plurality of rolls of sheet are prepared and the sheet is pulled out from each of the rolls to be adhered to each other; the same shall apply hereinafter), degradation of material yield is also brought about in the functional sheets, resulting in increase in costs. On the other hand, cutting out the optical sheet of the present invention first and then adhering thereto one by one another functional sheet cut out in the same size causes degradation of the productivity.

Accordingly, an object of the present invention is to provide: an optical sheet roll which enables improvement of yield by reducing the parts that are not usable as an optical sheet when cutting out an optical sheet in an arbitrary size; a method for manufacturing the optical sheet roll; a method for manufacturing an optical sheet using the optical sheet roll; and a method for manufacturing a display device using the optical sheet roll.

Means for Solving the Problem

Hereinafter, the present invention will be described. In order to make the present invention easier to understand, reference numerals of the attached drawings are quoted in parentheses; however, the present invention is not limited to the embodiments shown in the drawings.

A first aspect of the invention provides a method for manufacturing an optical sheet roll (1) formed by rolling up a belt-like optical sheet (40) comprising a base material layer (30), and an optical functional layer (10) which has light-transmissive portions (11, 11, . . . ) capable of transmitting light and formed in a row along a surface of the base material layer, and which has grooves (12, 12, . . . ) arranged between the light-transmissive portions, wherein the method comprises the steps of forming the light-transmissive portions on one surface side of the base material layer and of rolling up the belt-like optical sheet comprising the base material layer and the optical functional layer; and the light-transmissive portions are formed such that a longitudinal direction of the grooves is oblique with respect to the longitudinal direction of the belt-like optical sheet; thereby the above problem is solved.

A second aspect of the invention is the method for manufacturing an optical sheet roll (1) according to the first aspect, the method further comprising the step of forming light-absorbing portions (13, 13, . . . ) by filling the grooves (12, 12, . . . ) with a black resin ink containing light-absorbing particles (15, 15, . . . ) and a binder made of a resin in which the light-absorbing particles are dispersed, and curing the binder.

A third aspect of the invention is the method for manufacturing an optical sheet roll (1) according to the first aspect, wherein the light-transmissive portions (11, 11, . . . ) are formed such that an oblique angle of the longitudinal direction of the grooves (12, 12, . . . ) with respect to the longitudinal direction of the belt-like optical sheet (40) is 0.5° or more and 10° or less.

A fourth aspect of the invention is the method for manufacturing an optical sheet roll (1) according to the first aspect, the method comprising the step of forming an antireflection layer or an anti-glare layer on the outermost layer.

A fifth aspect of the invention is the method for manufacturing an optical sheet roll (1) according to the first aspect, the method comprising the step of forming a wavelength filter layer having a function of preventing transmission of a light with a predetermined wavelength.

A sixth aspect of the invention is the method for manufacturing an optical sheet roll (1) according to the first aspect, the method comprising the step of forming an electromagnetic wave shielding layer having a function of blocking electromagnetic waves.

A seventh aspect of the invention provides a method for manufacturing an optical sheet, the method comprising the steps of: manufacturing an optical sheet roll (1) by the method for manufacturing an optical sheet roll according to the first aspect; and cutting out from the belt-like optical sheet provided to the optical sheet roll, an optical sheet in a square shape having a side parallel to the longitudinal direction of the belt-like optical sheet; thereby the above problem is solved.

An eight aspect of the invention provides a method for manufacturing a display device comprising an image light source and an optical sheet disposed on an observer side of the image light source, the method comprising the steps of: manufacturing the optical sheet by the method of manufacturing an optical sheet according to the seventh aspect; and disposing the optical sheet on the observer side of the image light source.

A ninth aspect of the invention provides an optical sheet roll (1) formed by rolling up a belt-like optical sheet (40) comprising a base material layer (30), and an optical functional layer (10) which has light-transmissive portions (11, 11, . . . ) capable of transmitting light and formed in a row along a surface of the base material layer, and which has grooves (12, 12, . . . ) arranged between the light-transmissive portions, wherein a longitudinal direction of the grooves is oblique with respect to the longitudinal direction of the belt-like optical sheet; thereby the above problem is solved.

A tenth aspect of the invention is the optical sheet roll (1) according to the ninth aspect, wherein light-absorbing portions (13, 13, . . . ) capable of absorbing light are formed in the grooves (12, 12, . . . ).

An eleventh aspect of the invention is the optical sheet roll (1) according to the ninth aspect, wherein an oblique angle of the longitudinal direction of the grooves (12, 12, . . . ) with respect to the longitudinal direction of the belt-like optical sheet (40) is 0.5° or more and 10° or less.

A twelfth aspect of the invention is the optical sheet roll according to the ninth aspect, comprising an antireflection layer or an anti-glare layer on the outermost layer.

A thirteenth aspect of the invention is the optical sheet roll according to the ninth aspect, comprising a wavelength filter layer having a function of preventing transmission of a light with a predetermined wavelength.

A fourteenth aspect of the invention is the optical sheet roll according to the ninth aspect, comprising an electromagnetic wave shielding layer having a function of blocking electromagnetic waves.

Effects of the Invention

According to the present invention, it is possible to provide: an optical sheet roll which enables improvement of yield by reducing the parts that are not usable as an optical sheet when cutting out an optical sheet in an arbitrary size; and a method for manufacturing the optical sheet roll. Further, as an additional advantageous effect brought about by the reduced cutting losses, in a case of adhering various functional sheets according to the uses of the optical sheet, even if the sheets are continuously adhered to each other in the highly productive roll-to-roll way, it is possible to inhibit the cost increase caused by the material losses at a time of cutting out an optical sheet. In addition, according to the present invention, by employing the method for manufacturing an optical sheet roll which is high in productivity as described above, it is possible to provide a method for manufacturing an optical sheet at reduced costs, and to provide a method for manufacturing a display device at reduced costs.

MODES FOR CARRYING OUT THE INVENTION

Figure 1:
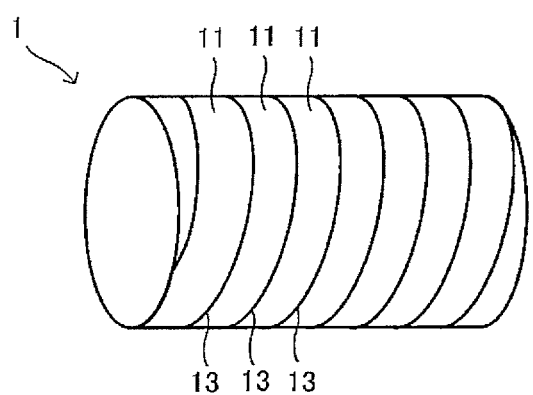
FIG. 1 is a perspective view schematically showing an optical sheet roll of the present invention according to one embodiment.

The functions and benefits of the present invention will be apparent from the following modes for carrying out the invention. Hereinafter, the invention will be described based on the following modes shown in the drawings. However, the invention is not limited to the embodiments.

Figure 2:
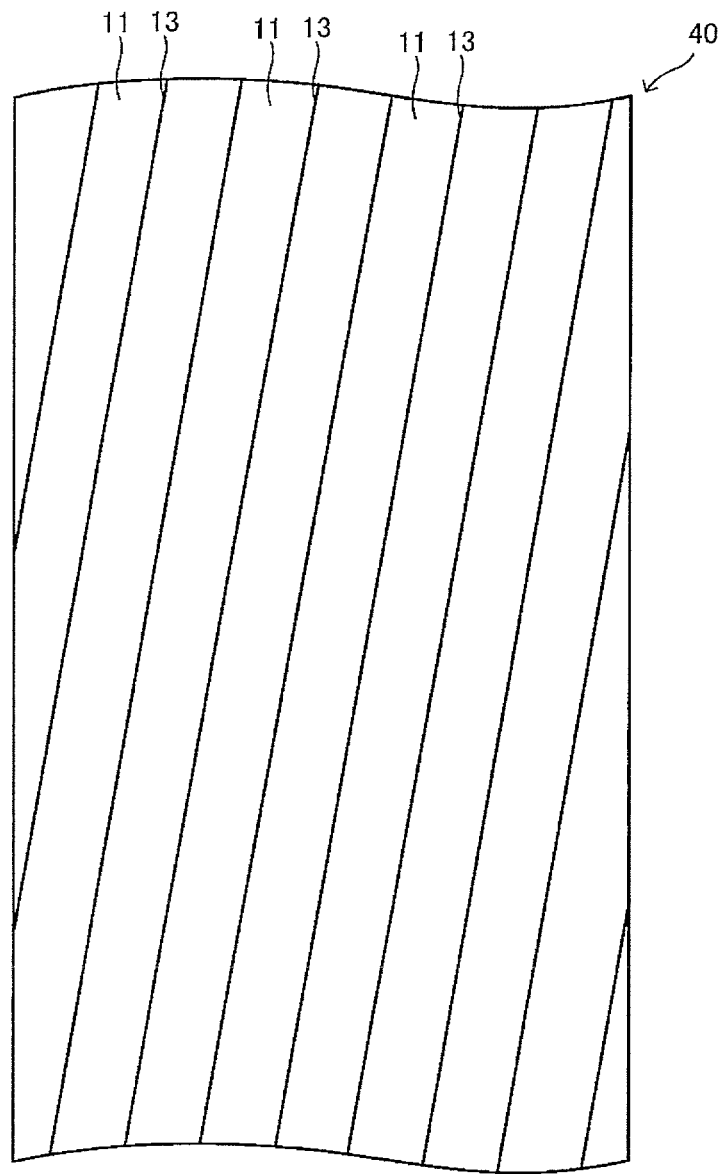
FIG. 2 is a plan view schematically showing a part of the belt-like optical sheet provided to the optical sheet roll of the present invention.
Figure 3:
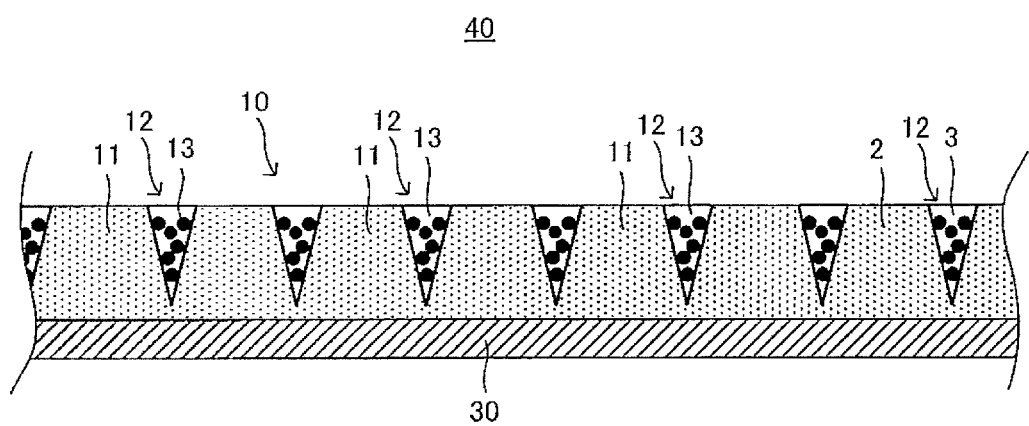
FIG. 3 is schematic view of a cross section of the belt-like optical sheet of one example provided to the optical sheet roll of the present invention.

FIG. 1 is a perspective view schematically showing the optical sheet roll 1 of the present invention according to one embodiment. In FIG. 1, in view of viewability, the repeating reference numerals are partly omitted (the same shall apply to each of the following figures.). FIG. 2 is a plan view schematically showing a part of the belt-like optical sheet 40 provided to the optical sheet roll 1 of the present invention. In FIG. 2, the top and bottom direction is the longitudinal direction of the belt-like optical sheet 40; and back and front direction is a layer thickness direction of the belt-like optical sheet 40. FIG. 3 is a schematic view showing a part of the cross section of the belt-like optical sheet 40. In FIG. 3, the top and bottom direction is the layer thickness direction of the belt-like optical sheet 40; and back and front direction is the longitudinal direction of the belt-like optical sheet 40.

The optical sheet roll 1 is formed by rolling up the belt-like optical sheet 40. As shown in FIG. 3, the belt-like optical sheet 40 comprises the base material layer 30 and the optical functional layer 10. Further, as shown in FIG. 2, the longitudinal direction of the light-absorbing portions 13, 13, ... of the optical functional layer 10 is configured to be oblique with respect to the longitudinal direction of the belt-like optical sheet 40 (the top and bottom direction in FIG. 2).

Figure 4:
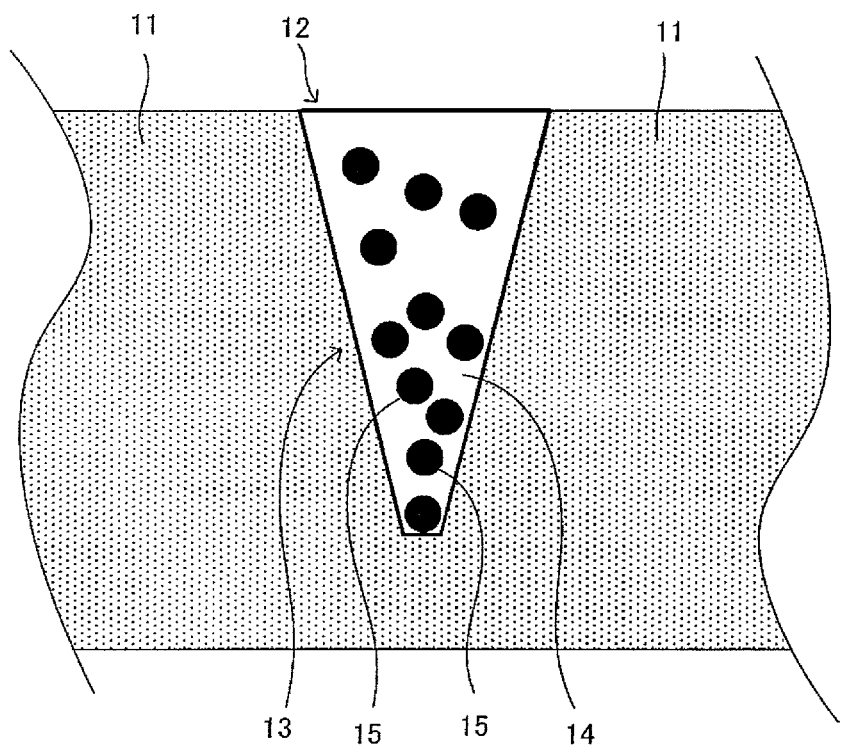
FIG. 4 is an enlarged schematic view of a part of the optical functional layer provided to the optical sheet roll of the present invention.

As shown in FIG. 3, the optical functional layer 10 comprises the light-transmissive portions 11, 11, ... having a substantially trapezoidal cross section in the layer thickness direction; and the light-absorbing portions 13, 13, ... disposed between the light-transmissive portions 11, 11, .... FIG. 4 shows an enlarged view focusing on one of the light-absorbing portions 13 and on the light-transmissive portions 11, 11 adjacent thereto. The optical functional layer 10 will be described with reference to FIGS. 3 and 4.

The light-transmissive portions 11, 11, ... have a substantially trapezoidal cross section arranged such that one sheet surface side is an upper base and the other sheet surface side is a lower base. Further, the light-transmissive portions 11, 11, ... are made of a light-transmissive resin having a refractive index Np.

As a resin to constitute the light-transmissive portion, it is usually preferable to use an ionizing radiation curable resin characterized to be cured by ionizing radiation such as ultraviolet. Examples of such an ionizing radiation curable resin include urethane acrylate.

In cases where the ionizing radiation curable resin is employed as the resin to constitute the light-transmissive portion and where the ionizing radiation is ultraviolet, a photoinitiator is added to the ionizing radiation curable resin. However, when the optical functional layer and other layers are stacked and a dye is contained in the layer directly contacting the molded face of the optical functional layer (i.e. the upper side face in FIG. 3), the photoinitiator remaining in the resin after the resin to constitute the light-transmissive portion is cured, is likely to cause deterioration of the dye. Therefore, the type and the amount of the photoinitiator added to the resin to constitute the light-transmissive portion needs to be arranged so as to prevent deterioration of the layer structure of the optical sheet and the dye to be used. Alternatively, some measures are preferably taken such as covering the molded face of the optical functional layer with the ionizing radiation curable resin (or arranging a blocking layer) so that the dye and the molded face of the optical functional layer will not be in direct contact with each other. In a case of arranging the blocking layer, the refractive index difference between the blocking layer and the resin filled in the light-absorbing portion of the optical functional layer is preferably ±0.05. There is sometimes a case when a tiny depression is formed on the molded face side of the light-absorbing portion; thus when the refractive index difference exceeds the above-mentioned range, this depression in the light-absorbing portion is likely to cause light to be scattered.

The thickness of the optical functional layer is usually approximately 50 μm to 100 μm. However, it is necessary to select a resin and to perform a curing process in a way that the base material layer is not caused to curl up due to the curing. Once the base material layer curls up, it is difficult to stack layers stably in the manufacturing process of the optical sheet. In order to prevent the base material layer from curling up, other than thickening the base material layer, such approaches may be employed as using a resin having little cure shrinkage, using a resin having larger tan δ (more likely to exhibit plastic deformation), and reducing a cross-link density by decreasing the amount of ionizing radiation to be irradiated. As for the structure of the resin to reduce cure shrinkage, there are approaches such as increasing an oligomer component having a molecular weight of 1000 or more; decreasing the ratio of a monomer having 3 or more functions; and increasing components having a bulky structure (e.g. aromatic and alicyclic compounds). Further, tan δ of a resin after curing is preferably 0.05 or more at room temperature and more preferably 0.1 or more. In addition, the glass-transition temperature (Tg) is preferably about 20° C. to 60° C.; exceeding this range is likely to cause problems such as blocking and cracking. tan δ is also called the loss tangent; and in measurement of viscoelasticity of a resin, it is used as an index for absorbability of energy when the force is applied and for plastic deformability.

The amount in which the base material layer curls up is preferably small: the degree to which an end portion of the base material layer rises is usually 20 mm or less on a flat plate and preferably 5 mm or less. Exceeding this value causes difficulty in a filter adhering process.

The light-absorbing portions 13, 13, . . . are formed in the grooves 12, 12, . . . that are formed between the light-transmissive portions 11, 11, . . . and have a substantially triangular cross section in the cross section shown in FIG. 3. The light-absorbing portions 13, 13, . . . are aligned such that a face equivalent to the base of the substantially triangular cross section faces the sheet surface on the upper base side of the light-transmissive portions 11, 11, . . . . With this configuration, one face of the optical functional sheet layer 10 is formed by the base of the light-absorbing portions 13, 13, . . . and the upper base of the light-transmissive portion 11, 11, . . . . At this point, the oblique line of the substantially triangular cross section preferably makes an angle of 0° or more and 10° or less against a normal direction of the sheet surface of the optical functional sheet layer 10. When the angle of the oblique line is nearly 0°, the shape of the light-absorbing portion is no longer a triangle but a rectangle.

Further, the light-absorbing portions 13, 13, . . . are constituted by a certain material having a refractive index Nb smaller than the refractive index Np of the light-transmissive portions 11, 11 . . . . In this way, by setting the relation between the refractive index Np of the light-transmissive portions 11, 11 . . . and the refractive index Nb of the light-absorbing portions 13, 13, . . . as Np>Nb, an image light from the light source incident upon the light-transmissive portions 11, 11, . . . can be adequately reflected at an interface between the light-absorbing portions 13, 13, . . . and the light-transmissive portions 11, 11, . . . based on the Snell's law under certain conditions; and a bright image can be provided to the observer. Further, the light having entered into the light-absorbing portions 13, 13, . . . is absorbed based on the Snell's law. It should be noted that the relation between the refractive indices is not necessarily limited to Np>Nb; the refractive indices Np and Nb may be the same, or the relation may be Np<Nb. When the relation is Np<Nb, the effect of improving the front face brightness of the image light becomes small; however, external light from the observer side is efficiently absorbed and the contrast is further improved. The amount of the refractive indices Np and Nb may be adequately determined based on the desired functions and effects. The difference between the refractive indices Np and Nb is not particularly limited; however, it is usually 0 or more and 0.1 or less.

In addition, the light-absorbing portions 13, 13, . . . of the optical functional sheet layer 10 are formed by filling the grooves 12, 12, . . . with a binder containing the light-absorbing particles 15, 15, . . . . In specific, the light-absorbing particles 15, 15, . . . are dispersed in the binder (a binder portion 14) (hereinafter, the binder in which the light-absorbing particles 15, 15, . . . are dispersed is sometimes referred to as a "black resin ink".). By this structure, in the light-absorbing portions 13, 13, . . . , the image light having entered into the light-absorbing portions 13, 13, . . . without being reflected at the interface between the light-transmissive portions 11, 11, . . . and the light-absorbing portions 13, 13, . . . can be absorbed by the light-absorbing particles 15, 15, . . . . Moreover, the external light from the observer side having entered at a certain angle can be adequately absorbed; thereby the contrast can be improved.

At this point, the binder is constituted by a material having the above mentioned refractive index Nb. A material used as the binder is not particularly limited; however, examples thereof include ionizing radiation curable resins characterized to be cured by ionizing radiation such as ultraviolet (e.g. epoxy acrylate).

A particle diameter of the light-absorbing particle influences processability and a filling rate at a time of filling. The filling rate is preferably high; and to this end, the particle diameter of the light-absorbing particle needs to be sufficiently small in relation to the width and depth of the groove to be filled. With respect to a gap L, an average particle diameter of the light-absorbing particle is preferably L/2 or less; more preferably L/3 or less, the gap L referring to the size of the width or the size of the depth of the groove to be filled with the light-absorbing particle, whichever is smaller. For example, if the depth of the groove is sufficiently secured and the opening width of the groove is 10 μm, the average particle diameter of the light-absorbing particle is preferably 5 μm or less and more preferably 3.5 μm or less. Herein, if the average particle diameter of the light-absorbing particle is larger than L/2, only one light-absorbing particle is actually arranged in the width direction of the groove, resulting in degradation of the filling rate. Additionally, in terms of processing, it is difficult to efficiently fill a light-absorbing particle larger than a half of the groove width into the deeper area of the groove. It should be noted that the average particle diameter is a diameter determined from the volume statistics measured by the Electrical Sensing Zone Method (Coulter Principle).

When the particle diameter of the light-absorbing particle is made small, the filling rate increases easily in a sense that it follows the shape of the groove. However, the number and the specific area of the light-absorbing particles per unit volume increase, degrading the fluidity of the black resin ink and also a scraping performance (the black resin ink is filled in the groove and thereafter an excess amount of the black resin ink is scraped off to form the light-absorbing portion; and the scraping performance refers to how easily the excessive amount of black resin ink is scraped off at that point). Herein, in order to improve the fluidity, other than increasing the amount of ionizing radiation curable resin, such approaches may be employed as adding surfactants etc., and using a low-viscosity type ionizing radiation curable resin. In terms of processing, such an approach may also be employed as raising the temperature of the black resin ink to increase the fluidity. Furthermore, in order to increase the filling rate, it is effective to use a mixture of the light-absorbing particles having different average particle diameters. In this case, the degradation of fluidity can be inhibited and small-sized light-absorbing particles can be effectively filled in between large-sized light-absorbing particles, thereby increasing the filling rate.

Taking into account the scraping performance at a time of filling the light-absorbing particles, the average particle diameter of the light-absorbing particle is preferably 1 μm or more. However, this is not an essential requirement; a light-absorbing particle with an average particle diameter of less than 1 μm may also be used as long as such approaches are taken as changing the scraping process; leaving a thin layer containing the black resin ink on the entire surface by purposefully reducing the degree of scraping; and coating the surface with a layer formed of the black resin ink which has a similar appearance to make the unevenness caused by scraping unnoticeable. Further, in order to improve the scraping performance, it is effective to for example change doctor blade conditions or use a continuous wiping device with a wiping roller. Examples of a method of supplying a black resin ink other than dripping it with a dispenser include applying it by using a die head and supplying it by using a finisher roller. A die head is suitable when the fluidity is poor and the evidence of supply of the black resin ink may become noticeable in the width direction.

The light-absorbing particle is not particularly limited as long as it has visible-light absorbability; however, it is preferably black-colored, and a commercially available particle may be used. For example, light-absorbing particles such as carbon black are preferably used; however, the light-absorbing particle is not limited thereto. A light-absorbing particle may also be used which absorbs a certain wavelength selectively in accordance with the properties of the image light. Specifically, examples include carbon black, graphite, fibrous carbon, a metal salt such as black iron oxide, colored glass beads and organic particulates colored by dye and pigment. Especially, in view of costs, quality, and availability, the colored organic particulates are preferably used. More specifically, an acrylic cross-linked particulate containing carbon black and an urethane cross-linked particulate containing carbon black are preferably used. A surface treatment may be performed to improve dispersibility of these particles.

When using as the light-absorbing particle, a resin bead containing black pigment such as carbon black, the amount of the pigment added in proportion to the resin bead is preferably about 10 to 50 wt %. If more amount of the pigment is added, problems such as breaking and cracking of the bead are likely to occur. Further, a refractive index of a resin to be used for the resin bead is preferably within a range of ±0.1 compared with a refractive index of the ionizing radiation curable resin of the binder to be used for the black resin ink.

It should be noted that a mixing ratio of the light-absorbing particle to the black resin ink is more suitable as a parameter affecting an actual filling rate when it is represented by a volume density than by a weight density which is influenced by the specific weight of the material. Herein, the volume density refers to a volume proportion of a light-absorbing particle to a volume of the pre-cured black resin ink. The volume density is preferably within a range of 10% to 73%, and more preferably within a range of 15% to 60%. The higher the volume density is, the more easily the filling rate is increased; however, exceeding a volume density of 73% results in the filling rate in closest packing (74%), and degrading the fluidity in extreme. Further, when the volume density is below 10%, a space between the light-absorbing particles becomes excessively wide, resulting in deterioration of light blocking ability of the black resin ink filled in the groove. When representing the mixing ratio at this point by a weight density, it is within a range of approximately 10% by weight to 70% by weight. In case of a problem of fluidity degradation of the black resin ink caused by raising the volume density, such a process may be carried out as diluting it with a solvent to fill it in the groove, and curing it by ionizing radiation after the solvent is dried. The volume density in this case refers to a volume proportion of the light-absorbing particle in a composition after the solvent is dried. The volume density can be determined, by calculation, from a specific weight and weight ratio of the material. Further, an actual filling rate can be examined based on a two-dimensional area of the light-absorbing particle in cross-sectional measurement.

In the description of the present invention given so far, the configuration has been introduced in which the cross-sectional shape of the light-absorbing portion is in a substantially triangular shape having two linear oblique lines; however the present invention is not limited thereto. The cross-sectional shape of the light-absorbing portion is usually configured to be wedge-shaped, trapezoidal, or rectangular; however, by using light-absorbing particles in a predetermined size, the light-absorbing particles form such a shape as dispersed inside the light-absorbing portion in a dendritically continuing manner (i.e. a three-phase structure of the light-transmissive portion, the binder contained in the black resin ink, and the light-absorbing particles). That is, a shape of the boundary between the binder (transparent resin) contained in the black resin ink and the light-transmissive portion is wedge-shaped, trapezoidal or rectangular; and by this three-phase structure, it is possible to effectively utilize, as a function of the optical functional layer, not only the light absorption by the light-absorbing particles but also the interface reflection by the binder component and the light transmission between the light-absorbing particles. Preferred proportion and particle diameter of the light-absorbing particle at this point are as previously described.

After filling the black resin ink, the cross-sectional shape of the light-absorbing portion formed by the mold roll has a boundary portion formed by the binder component. The cross sectional shape of the light-absorbing portion does not need to be uniform in the plane; there may be a distribution in the size and depth of the groove, or the shape may be varied like a Fresnel lens. At this point, the light-absorbing particles are dispersed inside the light-absorbing portion dendritically, as described above; therefore, there is not much difference in the in-plane distribution of the light absorbing performance of the light-absorbing particle between each groove, compared with the difference in the in-plane distribution of transmission/reflection at each groove interface.

Next, the base material layer 30 will be described. The base material layer 30 is a film layer serving as a base to form the above-described light-transmissive portions 11, 11, . . . and the light-absorbing portions 13, 13, . . . on the base material layer 30. The base material layer 30 is mainly composed of PET. In specific, it is unified with the optical functional sheet 10. As long as PET is contained in the base material layer 30 as the main component, the base material layer 30 may also contain other resins. In addition, various kinds of additives may be added thereto in an adequate amount. Examples of generally used additives include: antioxidants such as phenol-based ones and stabilizers such as lactone-based ones. Here, the term "main component" means that 50% by mass or more of the above mentioned PET is contained based on the whole material forming the base material layer (hereinafter, the same shall apply.).

The main component of the base material layer 30 does not necessarily have to be PET; polyester-based resins may be used such as polybutylene terephthalate resin (PBT) and polytrimethylene terephthalate resin (PTT). In the present embodiment, in view of mass production, costs, and availability as well as performance, a resin composed mainly of PET is preferable.

In producing the optical functional layer 10 that has been described so far, first the light-transmissive portions 11, 11, . . . are formed on one surface side of the base material layer 30, after which the black resin ink is filled in the grooves 12, 12, . . . between the light-transmissive portions 11, 11, . . . . Then after scraping off an excessive amount of the black resin ink, the binder contained in the black resin ink in the grooves 12, 12, . . . is cured. Thereby the optical functional layer is obtained. Details are given below.

Figure 5:
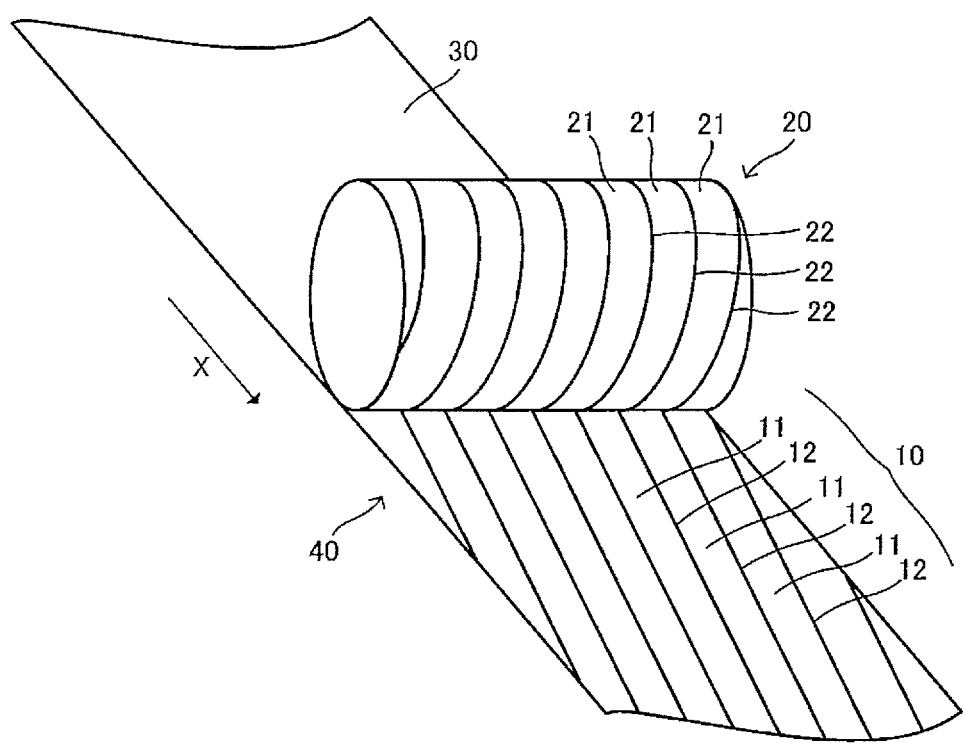
FIG. 5 is a view illustrating a method of forming the light-transmissive portion provided to the optical sheet roll of the present invention.

Hereinafter, a method of forming the light-transmissive portions 11, 11, . . . will be described, with reference to FIG. 5. FIG. 5 illustrates a method of producing the light-transmissive portions provided to the optical sheet roll 1. A mold roll 20 shown in FIG. 5 has recess portions 21, 21, . . . formed on its outer circumferential surface, the recess portions having a shape corresponding to the light-transmissive portions 11, 11, . . . desired to be formed. The recess portions 21, 21, . . . are formed such that a longitudinal direction thereof is oblique at a certain angle with respect to the circumferential direction of the mold roll 20. In forming the light-transmissive portions 11, 11, . . . by using the mold roll 20, while a resin to constitute the light-transmissive portions 11, 11, . . . is provided in between the mold roll 20 and the base material layer 30 provided in a direction shown by Arrow X, the mold roll 20 is rotated on the base material layer 30 and the resin is cured. Thereby, it is possible to obtain the belt-like optical sheet 40 comprising: the light-transmissive portions 11, 11, . . . having a shape corresponding to the shape of the recess portions 21, 21, . . . ; and the grooves 12, 12, . . . having a shape corresponding to the shape of the protrusion portions 22, 22, . . . formed between the recess portions 21, 21, . . . . At this point, the recess portions 21, 21, . . . and the protrusion portions 22, 22, . . . are formed on the outer circumferential surface of the mold roll 20 in such a manner that a longitudinal direction thereof is oblique at a certain angle with respect to the circumferential direction of the mold roll 20. As such, the longitudinal direction of the light-transmissive portions 11, 11, . . . and that of the grooves 12, 12, . . . are oblique with respect to the longitudinal direction of the belt-like optical sheet 40 (the direction being shown by Arrow X in FIG. 5).

After filling the above-described black resin ink in the grooves 12, 12, . . . of the belt-like optical sheet 40 obtained in the above manner and scraping off an excessive amount of the black resin ink, the binder contained in the black resin ink in the grooves 12, 12, . . . is cured; thereby the light-absorbing portions 13, 13, . . . can be formed.

By forming the grooves 12, 12, . . . with the mold roll 20, it is possible to decrease the probability of causing problems in the light-absorbing portions 13, 13, . . . . More specifically, when there exist bubbles, light-absorbing particles etc. protruding on the surface to be scraped at a time of filling the black resin ink in the grooves 12, 12, . . . and scraping off the excess amount of black resin ink, the bubbles and the light-absorbing particles are dragged, causing the likelihood of leaving streakiness on the light-absorbing portions 13, 13, . . . . However, if the longitudinal direction of the light-absorbing portions 13, 13, . . . is oblique with respect to the longitudinal direction of the belt-like optical sheet 40 as described above, it is less likely that the bubbles, the light-absorbing particles etc. protruding on the surface to be scraped continue to be dragged at the time of scraping off the excessive amount of black resin ink in a direction parallel to the longitudinal direction of the belt-like optical sheet 40. As such, the probability of causing problems to the light-absorbing portions 13, 13, . . . can be decreased.

By forming the light-absorbing portions 13, 13, . . . in the above manner, it is possible to obtain the belt-like optical sheet 40 in which the optical functional layer 10 comprising the light-transmissive portions 11, 11, . . . and the light-absorbing portions 13, 13, . . . is formed on the base material layer 30 (see FIG. 2). And by rolling up the belt-like optical sheet 40, the optical sheet roll 1 can be obtained.

Figure 7:
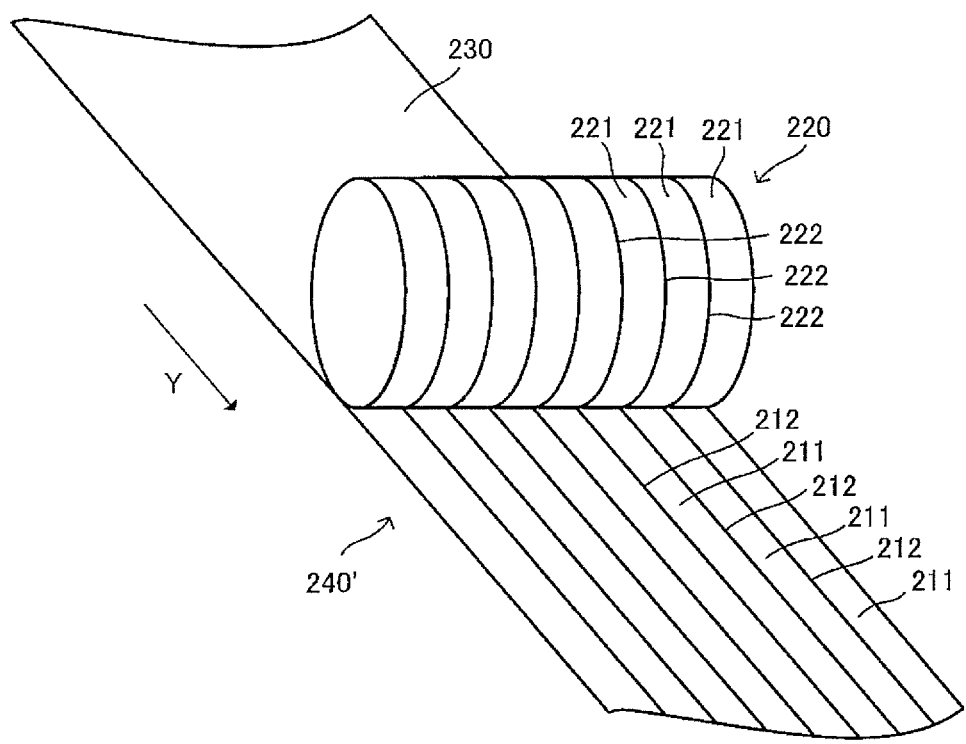
FIG. 7 is a view illustrating a method of forming the light-trasmissive portion provided to the conventional optical functional layer.
Figure 8:
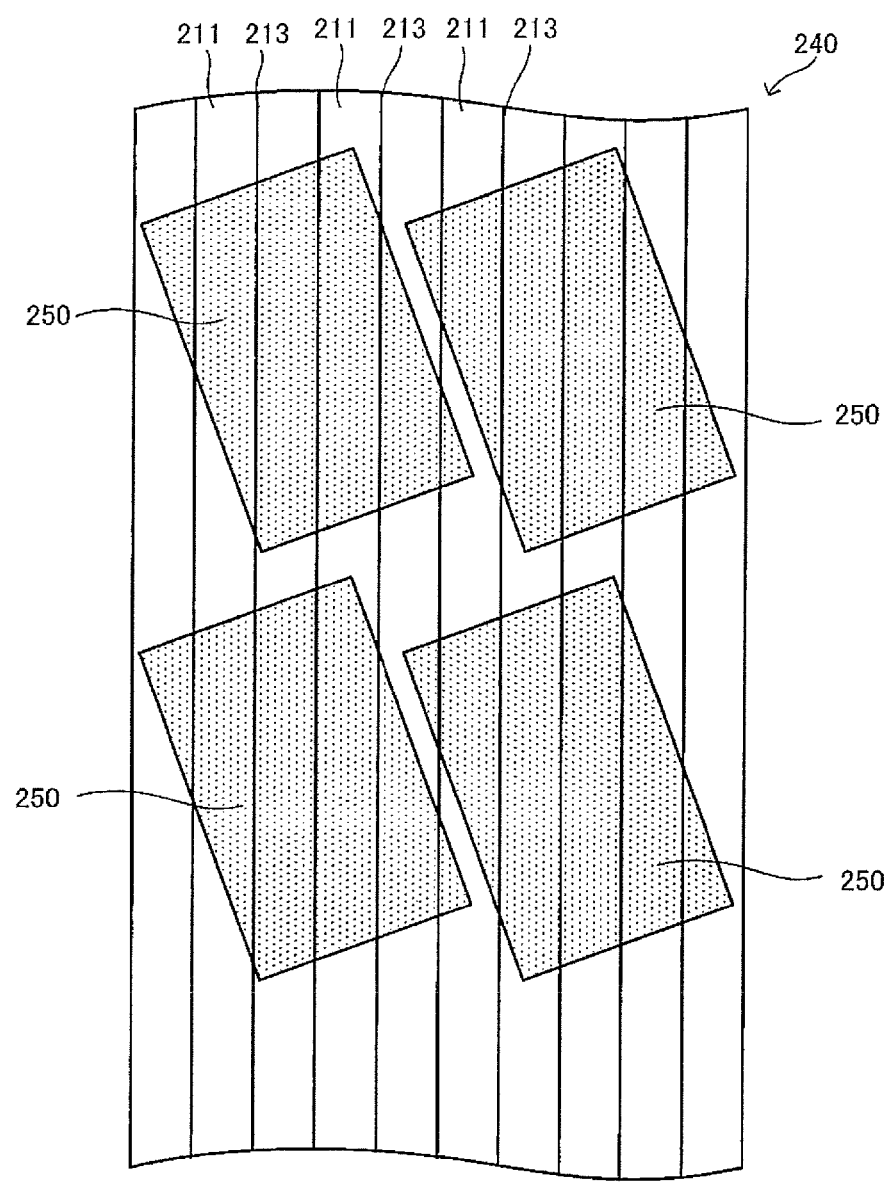
FIG. 8 is a top view schematically showing a manner in which an optical sheet is cut out from a part of the conventional belt-like optical sheet.

In a case when an optical sheet having a stack of the optical functional layer comprising the light-transmissive portions and the light-absorbing portions and other functional layers is used in combination with a plasma display panel (hereinafter, referred to as "PDP"), a moire interference pattern may occur. In order to inhibit occurrence of the moire interference pattern, it is preferable to arrange the light-transmissive portions such that the longitudinal direction thereof is oblique with respect to the side of the optical functional layer. In order to do this, in an optical functional layer produced by the conventional method, it is necessary to cut out the optical sheets 250, 250, . . . obliquely with respect to the longitudinal direction of the belt-like optical sheet 240 (the direction shown by Arrow Y in FIG. 7), as shown in FIG. 8. And at this time, there exist a number of parts that are not usable as the optical sheet 250, 250, . . . .

Figure 6:
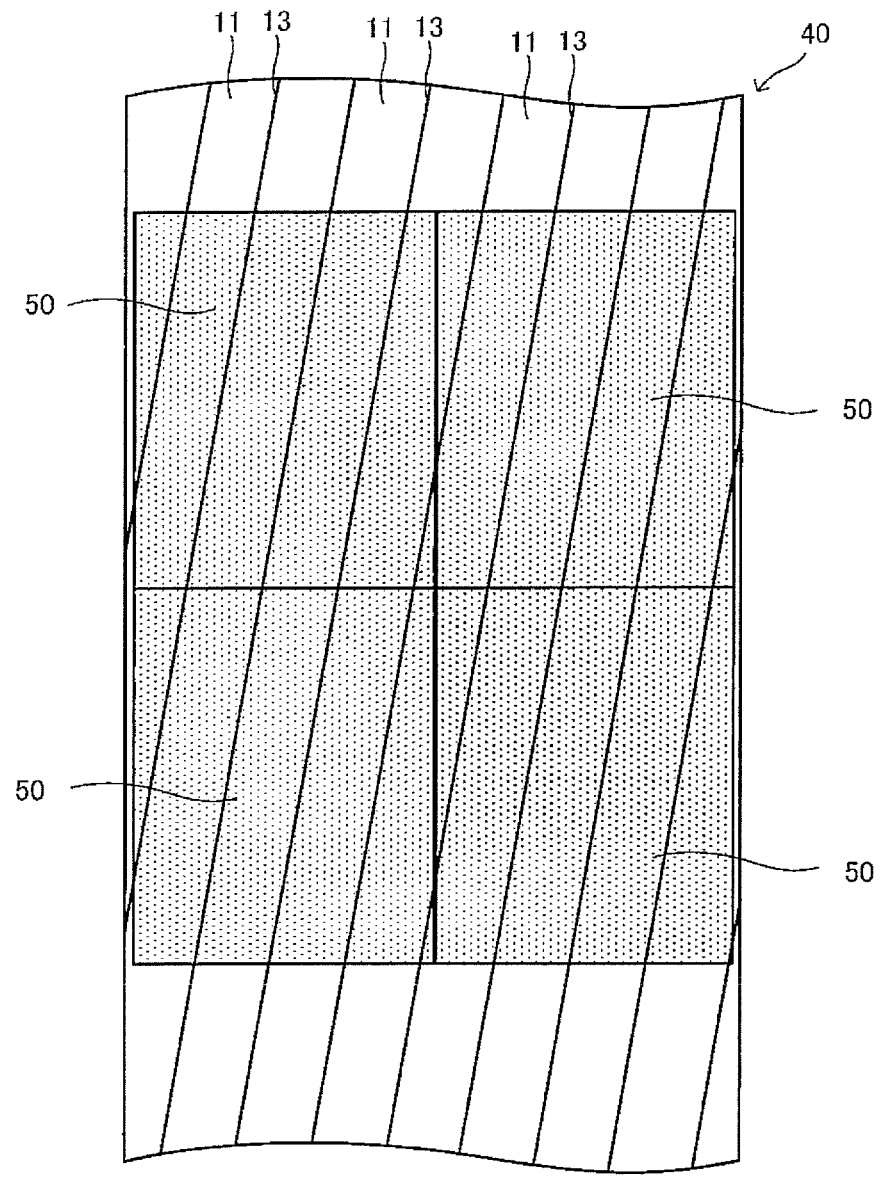
FIG. 6 is a top view schematically showing a manner in which an optical sheet is cut out from a part of the belt-like optical sheet provided to the optical sheet roll of the present invention.

On the other hand, the belt-like optical sheet 40 provided to the optical sheet roll 1 of the present invention is formed such that the longitudinal direction of the light-transmissive portions 11, 11, . . . is oblique with respect to that of the belt-like optical sheet 40. Therefore, by cutting out the optical sheets 50, 50, . . . along the longitudinal direction of the belt-like optical sheet 40 as shown in FIG. 6, it is possible to obtain the optical sheets 50, 50, . . . having the light-transmissive portions 11, 11, . . . arranged such that the longitudinal direction of thereof is oblique with respect to the side of the optical functional layer 10. FIG. 6 is a plan view schematically showing a manner in which the optical sheets 50, 50, . . . are cut out from a part of the belt-like optical sheet 40 provided to the optical sheet roll 1.

Therefore, according to the optical sheet roll 1, it is possible to improve the yield by reducing the parts that are not usable as the optical sheets 50, 50, . . . .

It should be noted that the an oblique angle of the longitudinal direction of the light-absorbing portions 13, 13, . . . with respect to the longitudinal direction of the belt-like optical sheet 40 is preferably 0.5° or more and 10° or less. By setting the angle at 0.5° or more, the effects of reducing moire can be increased at a time when the rectangular optical sheet 50 is adhered to the image source, the rectangular optical sheet 50 being cut out from the optical sheet roll 1 in a manner that one side thereof is parallel to the longitudinal direction of the belt-like optical sheet 40. Further, by setting the angle at 10° or less, it is possible to inhibit degradation of the productivity of the belt-like optical sheet 40.

In adhering the optical sheet comprising the optical functional layer 10 to the image source, the optical sheet may be configured to comprise only one optical functional layer 10; or the optical sheet having two optical functional layers 10 stacked may also be used. When two optical functional layers 10 stacked are used, the two optical functional layers 10 may be adhered to each other with a layer having an adhesive function; the optical functional layer 10 may be formed on both faces of one transparent base material; or the optical functional layers 10 may be stacked successively on one side of the transparent base material.

Further, when two optical functional layers 10 are used, each of the optical functional layers 10 may have a different configuration. For example, a width, pitch, depth (thickness), and shape of the light-absorbing portions 13, 13, . . . may be varied between the first optical functional layer 10 and the second optical functional layer 10; the thickness direction of the light-absorbing portions 13, 13, . . . may be changed (i.e. the wedge shape or the trapezoidal shape may be turned around); and a bias angle of the light-absorbing portions 13, 13, . . . with respect to the image source (the oblique angle of the longitudinal direction of the light-absorbing portions 13, 13, . . . with respect to the horizontal direction) may be changed. Furthermore, the refractive index of the material to constitute the light-absorbing portions 13, 13, . . . and the concentration of the light-absorbing particles 15, 15, . . . may be changed. It is preferable to allow each of the layers to have different function effects for example in such a way that the first layer focuses on cutting external light effectively and improving the contrast, and the second layer focuses on the effects of improving the front face brightness by utilizing the reflection.

In a case when the first optical functional layer 10 is configured to be disposed in a manner that the light-absorbing portions 13, 13, . . . make an angle of ±0° to 30° against the horizontal direction (hereinafter, referred to as a "substantially horizontal direction") to effectively cut the illuminating light emitted from an indoor upper side, it is preferable to dispose the second optical functional layer 10 in a manner that the light-absorbing portions 13, 13, . . . make an angle of ±160° to 120° against the horizontal direction (hereinafter, referred to as a "substantially perpendicular direction"). In this case, the combination of the oblique angles of the light-absorbing portions 13, 13, . . . of each optical functional layer 10 with respect to the horizontal direction needs to be such that moire will not be a problem to the appearance in combining the image source, each optical functional layer, and/or below-described electromagnetic shielding layer. In order to reduce the moire, it is effective to not only change the combination of the oblique angles of the light-absorbing portions 13, 13, . . . of each optical functional layer 10 with respect to the horizontal direction, but also for example make the width of the light-absorbing portions 13, 13, . . . narrow and change the pitch. However, there is no such a case that a specific numerical range is always absolutely satisfactory for sure.

As described above, in view of the productivity and the like, it is preferable to produce the belt-like optical sheet 40 wherein the oblique angle of the longitudinal direction of the light-absorbing portions 13, 13, . . . is 0.5° or more and 10° or less with respect to the longitudinal direction of the belt-like optical sheet 40. However, in order to cut out an optical sheet in an adequate size from the belt-like optical sheet 40 to adhere it to the image source, and to effectively cut the illuminating light emitted from the indoor upper side, it is considered preferable that the angle of the longitudinal direction of the light-absorbing portions 13, 13, . . . with respect to the horizontal direction is within a range of ±0° to 30°. Further, when two optical functional layers 10 are stacked, more complex moire may occur compared with a case when one optical functional layer 10 is used, and the problem of moire may not be solved by setting the angle of the longitudinal direction of the light-absorbing portinos 13, 13, . . . with respect to the horizontal direction at 0.5° or more and 10° or less; thus larger angles may need to be made. In such a case, it is necessary to cut out from the belt-like optical sheet 40, an optical sheet obliquely with respect to the longitudinal direction of the belt-like optical sheet 40, to obtain the optical sheet having a large angle of the longitudinal direction of the light-absorbing portions 13, 13, . . . with respect to the horizontal direction. However, this oblique angle at the time of cutting out the optical sheet can be made smaller compared with a case of the conventional belt-like optical sheet having a longitudinal direction of the belt-like optical sheet parallel to that of the light-absorbing portion; therefore material losses can be reduced.

A function effect of the second optical functional layer 10 disposed in such a manner that the light-absorbing portions 13, 13, . . . are aligned in the substantially perpendicular direction is preferably to converge forward in the front face direction, the light which originally diffuses in the right and left direction of the screen. To achieve this effect, it is necessary to adequately design for example the cross-sectional shape of the light-absorbing portions 13, 13, . . . , the refractive index difference (refractive index ratio) between the light-absorbing portions 13, 13, . . . and the light-transmissive portions 11, 11, . . . . Further, simply stacking two optical functional layers 10 having approximately the same opening ratio decreases transmittance; thus a configuration is preferable of increasing an opening ratio of each layer or an opening ratio of the second optical functional layer 10 depending on the design specifications of the optical sheet.

Specifically, when converging the light that is originally diffused in the right and left direction, the cross-sectional wedge shape (substantially triangular shape or substantially trapezoidal shape) of the light-absorbing portions 13, 13, . . . is preferably arranged such that the side with a narrow groove width is directed toward the observer side. Further, a refractive index difference $\Delta n$ is preferably within a range of $0.07 \geq \Delta n \geq 0.03$; and an angle of the oblique line of the wedge-shaped cross section is preferably larger than 0° and 15° or less. Furthermore, the opening ratio is preferably 40% or more.

The positional relation of the optical functional layers 10 in the optical sheet is not particularly restricted. When seen from the observer side, the optical functional layer 10 in a substantially horizontal direction and the optical functional layer 10 in a substantially perpendicular direction may be arranged in the mentioned order, or vice versa; or a layer having other function such as a below described wavelength filter layer, electromagnetic shielding layer, and impact absorbing layer may be sandwiched between each optical functional layer 10.

In the above description of the present invention, the base material layer and the optical functional layer formed on the base material layer have been illustrated as the layers provided to the belt-like optical sheet of the optical sheet roll. However, the optical sheet roll of the present invention is not limited to such a configuration; layers having various other functions may also be provided depending on the uses. At this point, the optical sheet roll of the present invention may be manufactured in the following way: preparing an optical sheet roll formed by rolling up the belt-like optical sheet comprising the base material layer and the optical functional layer produced in the above described manner, and a sheet roll formed by rolling up a belt-like sheet having other functions; and continuously adhering these sheet rolls to each other in the roll-to-roll way. Further, the optical sheet roll of the present invention can be manufactured also by stacking a layer having other function, in a discontinuous pattern by intermittent application or pattern printing, on the belt-like optical sheet which has been pulled out from the optical sheet roll formed by rolling up the belt-like optical sheet comprising the base material layer and the optical functional layer produced in the above manner. Furthermore, the optical sheet roll of the present invention can be manufactured also by continuously adhering in the roll-to-roll way, the optical sheet roll formed by rolling up the belt-like optical sheet comprising the base material layer and the optical functional layer produced in the above manner, to the sheet roll formed by rolling up a belt-like sheet having a layer with other function patterned. In addition, the optical sheet roll of the present invention can be manufactured also by forming other layers on one surface side of the base material layer and thereafter forming the optical functional layer on the other surface side of the base material layer in the above described manner.

When cutting out an optical sheet from the optical sheet roll of the present invention to use it, after or before it is cut out, layers having various other functions can be stacked depending on the uses. However, by cutting out an optical sheet in an adequate size after manufacturing the optical sheet roll comprising a plurality of layers as described above, it is possible to improve the productivity and to inhibit cost increase caused by material losses at the time of cutting out the optical sheet.

As to the layer having other function to be provided to the optical sheet roll of the present invention, the one used for the conventional optical sheet may be employed without any particular restrictions. Specific examples thereof include: an antireflection layer, an adhesive layer, an electromagnetic wave shielding layer, a wavelength filter layer, an anti-glare layer, and a hard coating layer. The stacking order and number of the layers to be stacked are adequately determined depending on the uses of the optical sheet. Hereinafter, the functions and the like of these layers will be described.

The antireflection layer is a layer provided on the side nearest to the observer side and has a function of preventing reflection of external light. With the antireflection layer, it is possible to prevent a case that the external light is reflected on the observer side face of the optical sheet and returns to the observer side and a so-called glare occurs causing difficulty in viewing the image. Such an antireflection layer can be composed, for example, by using a commercially available antireflection film.

The adhesive layer is a layer provided with an adhesive. An example of the adhesive may be PSA (a pressure sensitive adhesive). However, the adhesive is not limited thereto as long as it exhibits required light-transmissivity, adhesiveness, and weatherability. The adhesive force is preferably, for example, approximately from several N/25 mm to 20N/25 mm. When the adhesive layer is applied onto a glass surface, in view of re-application (rework) and recycling, the adhesive force of from approximately several N/25 mm to 10N/25 mm is desirable. When adhering the adhesive layer to an electromagnetic wave shielding layer, it is desirable to contain antioxidant such as benzotriazole or not to contain an acid group such as —COOH and —NH$_2$. Moreover, depending on the layer structure, in order to prevent deterioration of the pigment, UV absorber having an effect of absorbing an ultraviolet ray (e.g. benzotriazole) is desirably included in the adhesive.

The electromagnetic wave shielding layer is literally a layer having a function to shield electromagnetic waves. As long as the layer has this function, the means for shielding electromagnetic waves is not particularly limited. Examples thereof may be a metal (e.g. copper) mesh. As for a method of obtaining the copper mesh, it is effective to form a fine copper mesh pattern by etching, vapor deposition and the like. The pitch etc. of the copper mesh can be adequately designed according to the electromagnetic waves to be shielded, required transmittance and occurrence of moire; a mesh having a pitch of about 300 μm and a line width of 12 μm may be given as an example.

The wavelength filter layer is a layer having a function to inhibit transmission of a light with a certain wavelength. The wavelength of a light to be inhibited from transmitting can be adequately selected according to the necessity, but the wavelength filter layer that can cut neon line emitted from the PDP or cut infrared rays and near-infrared rays may be given as an example. This layer may be combined with another functional layer, for example, with the adhesive layer.

An impact absorbing layer is a layer for protecting a panel (glass) of the PDP from the external impact. Usually, a thickness of the layer is approximately 200 to 1000 μm; and a resin material (having a dominant loss elastic modulus) that absorbs the impact is used for the layer.

The anti-glare layer is a layer to inhibit glare. It is sometimes called an AG layer. As the anti-glare layer, a commercially available one can be used.

The hard coating layer is sometimes also called an HC layer. The hard coating layer is a layer provided with a film having a function of abrasion-resistance to prevent the image display surface from scratches.

Next, a method for manufacturing an optical sheet will be described. The method for manufacturing an optical sheet of the present invention comprises the steps of: manufacturing an optical sheet roll by the above described method for manufacturing an optical sheet roll of the present invention; and cutting out from the belt-like optical sheet provided to the optical sheet roll, an optical sheet in a square shape having a side parallel to the longitudinal direction of the belt-like optical sheet. The method for manufacturing an optical sheet roll has been described above; thus the descriptions thereof are omitted. Further, the method of cutting from the belt-like optical sheet, the optical sheet in the square shape having the side parallel to the longitudinal direction of the belt-like optical sheet is not particularly restricted; thus conventional methods may be employed.

As described above, the optical sheet roll of the present invention can reduce the material losses caused at the time of cutting out an optical sheet. Since the method for manufacturing an optical sheet of the present invention refers to a method of cutting out an optical sheet from the optical sheet roll, according to the method for manufacturing an optical sheet of the present invention, an optical sheet can be manufactured at reduced costs.

It should be noted that in the method for manufacturing an optical sheet of the present invention, after cutting out an optical sheet in an adequate size from the optical sheet roll of the present invention, a layer with other function not having been provided to the optical sheet roll may be added to the optical sheet. With this configuration as well, it is possible to reduce the material losses caused at the time of cutting out an optical sheet from the optical sheet roll of the present invention, thus enabling manufacturing of an optical sheet at reduced costs.

Next, the method for manufacturing a display device of the present invention will be described. The method for manufacturing a display device of the present invention refers to a method for manufacturing a display device that comprises an image light source and an optical sheet disposed on the observer side of the image light source, the method comprising the steps of: manufacturing an optical sheet by the above method of manufacturing an optical sheet of the present invention; and disposing the optical sheet on the observer side of the image light source. The method for manufacturing a display device of the present invention will be described with reference to FIGS. 9 and 10.

Figure 9:
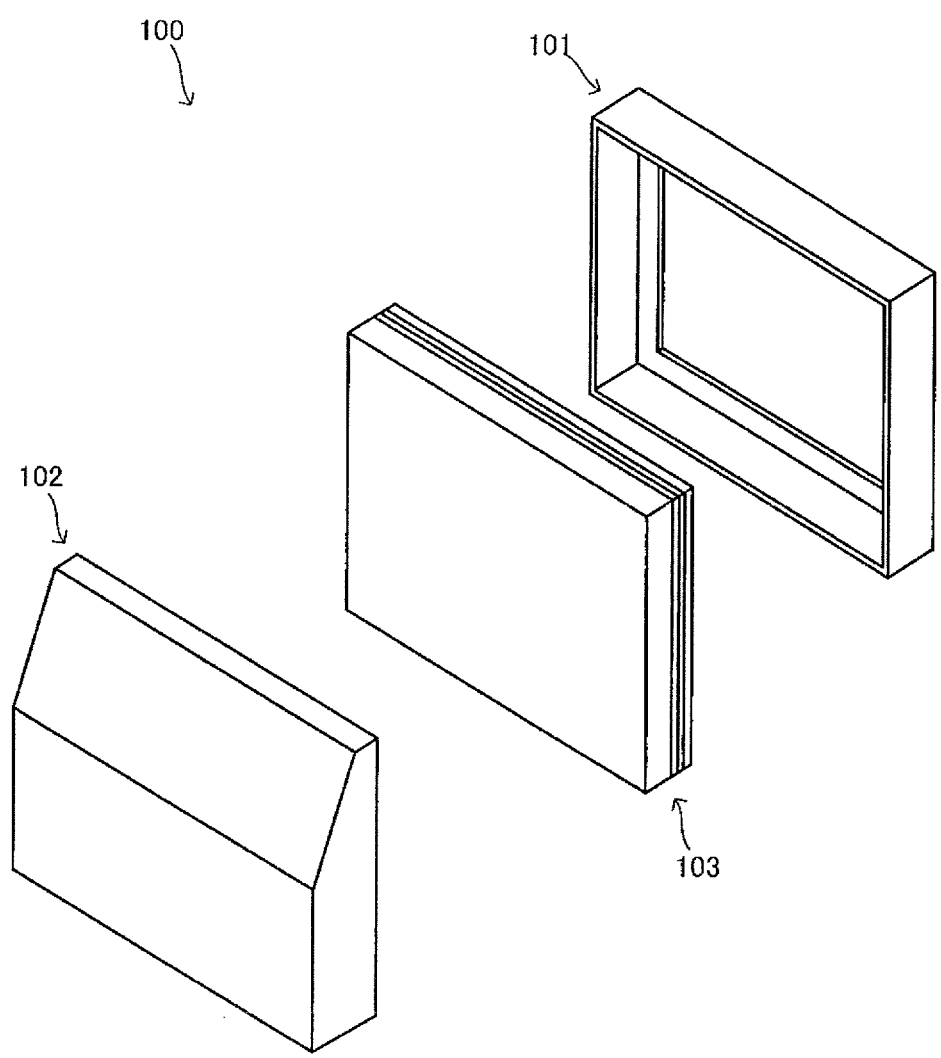
FIG. 9 is an exploded perspective view schematically showing a plasma television to be manufactured by the method for manufacturing a display device of the present invention according to one embodiment.
Figure 10:
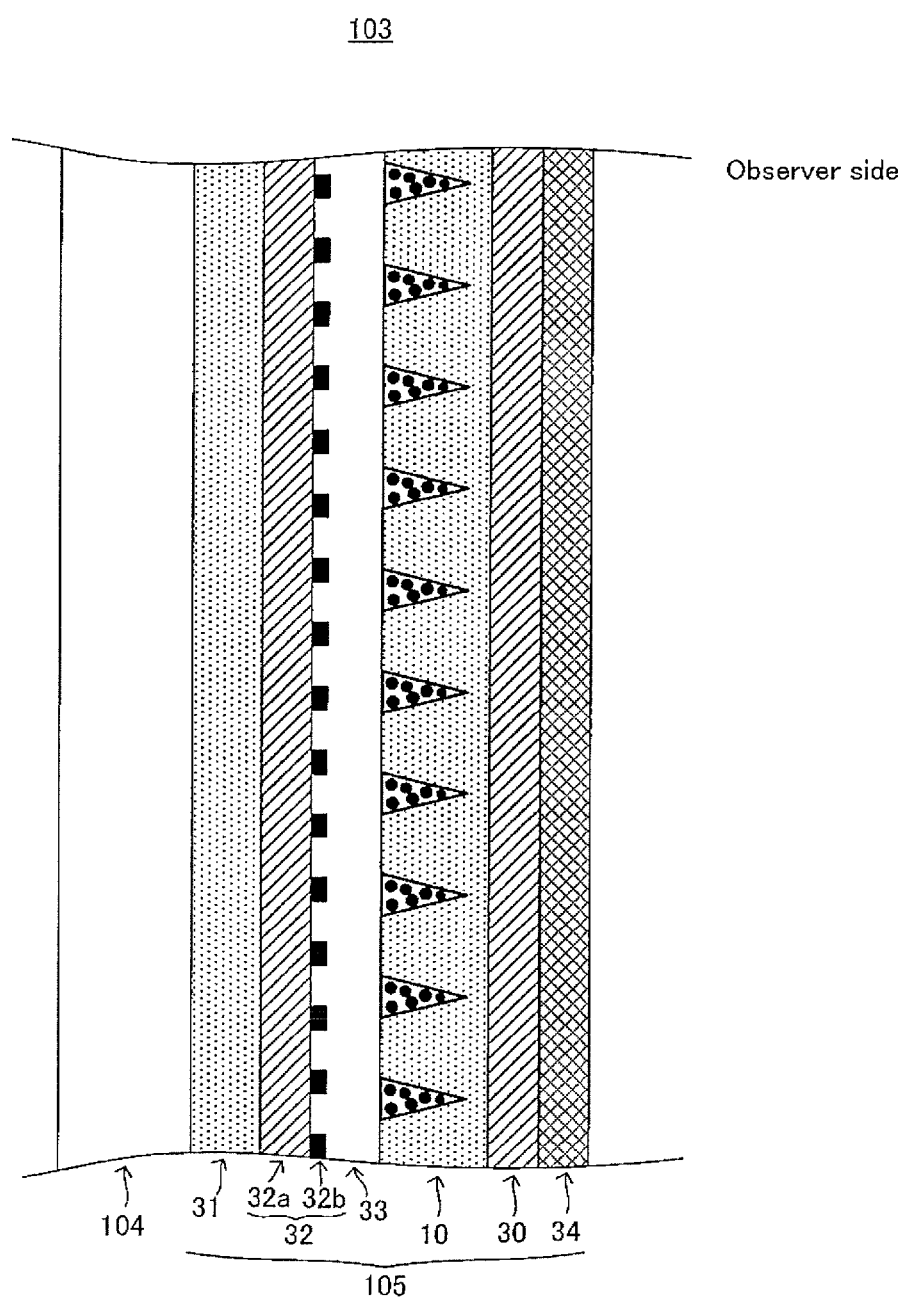
FIG. 10 is a schematic view of one part of a cross section of a plasma display panel unit to be provided to the plasma television shown in FIG. 9.

FIG. 9 is an exploded view schematically showing a display device 100 (plasma television 100) which is manufactured by the method for manufacturing a display device of the present invention in accordance with one embodiment. In FIG. 9, the upper right side represents an observer side; the lower left side represents a rear side. As can be seen from FIG. 9, the plasma television 100 comprises a plasma display panel unit 103 (PDP unit 103) inside a housing formed of a front housing 101 and a rear housing 102. In addition to the PDP unit 103, various devices that are commonly provided to a plasma television are provided inside the housing of the plasma television 100. Examples of the devices include various kinds of electrical circuits and cooling devices. FIG. 10 schematically shows a configuration of the PDP unit 103. In FIG. 10, the right side represents an observer side. The PDP unit 103 comprises: a plasma display panel 104 (PDP 104) being an image light source; and an optical sheet 105 disposed on a side where an image light of the PDP 104 is emitted. Here, a known plasma display panel may be employed as the PDP 104. Further, a specific layer structure of the optical sheet 105 may be adequately modified, as described above; however, in FIG. 10, the following configuration is given as an example: the optical sheet 105 comprises: a wavelength filter layer 31; an electromagnetic shielding layer 32 having a metal mesh layer 32b formed on a base material layer 32a; an adhesive layer 33; an optical functional layer 10; a base material layer 30; and an antireflection layer 34.

The optical sheet 105 is an optical sheet which is manufactured by the method for manufacturing an optical sheet of the present invention; and since the manufacturing method has been described above, the descriptions thereof are omitted. The method of disposing the optical sheet 105 manufactured in the above described manner on the observer side of the PDP 104 is not particularly restricted; a known method may be employed. The plasma television 100 can be manufactured by disposing the optical sheet 105 on the observer side of the PDP 104 in this manner and accommodating the PDP unit 103 and the other members into the housing.

As described above, according to the method for manufacturing an optical sheet of the present invention, it is possible to manufacture an optical sheet at reduced costs. Accordingly, with the method for manufacturing a display device of the present invention using an optical sheet manufactured by the method for manufacturing an optical sheet of the present invention, it is possible to manufacture a display device at reduced costs.

EXAMPLES

Hereinafter, the present invention will be described in more detail with Examples. However, the present invention is not limited to the Examples Example 1

A copper-plated cylinder is used to obtain a mold roll through the following procedures. First, by turning processing, the cylinder was cut with a diamond bit such that spiral-shaped multiple grooves having a longitudinal direction inclined at an angle of 4.5° with respect to the circumferential direction are formed on the outer circumferential surface of the cylinder. After that, the surface was subjected to chromium plating to obtain a mold roll (a biased mold roll). Next, an urethane ultraviolet curable resin having a post-curing refractive index of 1.55 was used to perform, in the above described method, a continuous molding process on a base material layer (manufactured by Toyobo Co., Ltd.; polyethylene terephthalate (PET) sheet; A4300; thickness 100 μm) with the above mold roll; light-transmissive portions and grooves arranged between the light-transmissive portions were formed; and thereby a belt-like optical sheet was obtained. A longitudinal direction of the grooves was inclined at 4.5° with respect to the longitudinal direction of the belt-like optical sheet. After that, a black resin ink (in which 20 parts by mass of black beads having an average particle diameter of 4 μm were dispersed based on 100 parts by mass of an ultraviolet curable binder: a post-curing refractive index of the binder to be contained is 1.547) was dropped onto the molded face (the face on the side where the light-transmissive portions are formed) to fill the grooves with the black resin ink. Then an excessive amount of the black resin ink was scraped off with a metallic doctor blade and the binder remaining in the grooves was cured. Through these steps, a belt-like optical sheet was obtained in which a longitudinal direction of light-absorbing portions was oblique at an angle of 4.5° with respect to the longitudinal direction of the belt-like optical sheet; and the belt-like optical sheet was rolled up to obtain an optical sheet roll. Furthermore, an optical sheet was obtained by cutting it out from the optical sheet roll into a size that it can be adhered to a 46 inch-sized image source. At this point, the optical sheet was cut out such that the long side of the rectangular optical sheet is parallel to the longitudinal direction of the belt-like optical sheet.

Example 2

A belt-like optical sheet was manufactured, the optical sheet was rolled up, and thereby an optical sheet roll was obtained in the same manner as in Example 1, except that: an oblique angle of the longitudinal direction of the grooves provided to the biased mold roll with respect to the circumferential direction was set at 3°; one face of the base material layer was subjected to an antireflection (AR) treatment to form an antireflection layer, and the other face of the base material layer was subjected to an easy adhesion treatment; and light-transmissive portions and light-absorbing portions (an optical functional layer) were formed on the face of the base material layer subjected to the easy-adhesion treatment. After that, a layer having other function was continuously adhered to the face on the side where the optical functional layer was formed, in a roll-to-roll way via an adhesive; and the resultant was rolled up, thereby obtaining an optical sheet roll. Furthermore, an optical sheet was obtained by cutting it out from the optical sheet roll into a size that it can be adhered to a 46 inch-sized image source. At this point, the optical sheet was cut out such that the long side of the rectangular optical sheet is parallel to the longitudinal direction of the belt-like optical sheet.

Example 3

Figure 11:
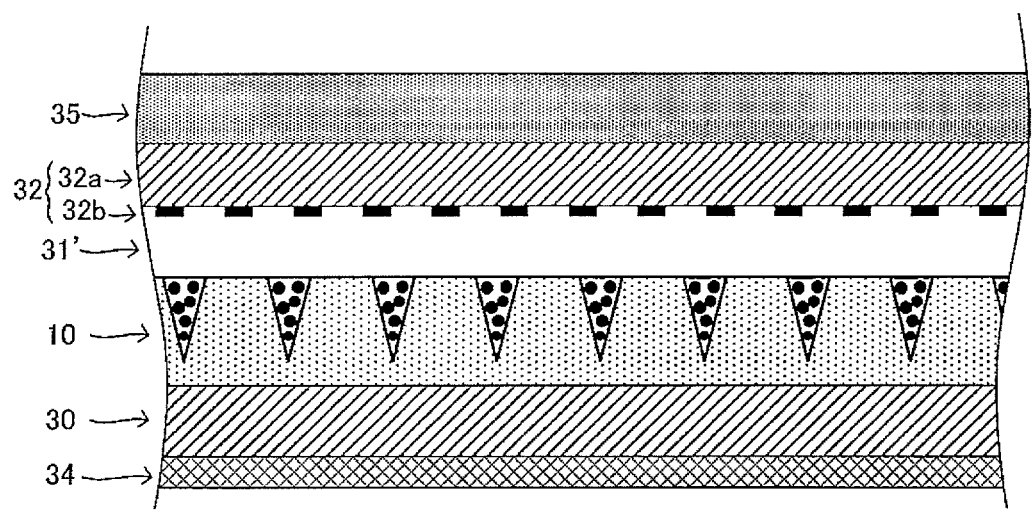
FIG. 11 is a schematic view of a cross section of an optical sheet according to Example 3.

A belt-like optical sheet was manufactured, the belt-like optical sheet was rolled up, and thereby an optical sheet roll was obtained in the same manner as in Example 1, except that: an oblique angle of the longitudinal direction of the grooves provided to the biased mold roll with respect to the circumferential direction was set at 6°; one face of the base material layer was subjected to an antireflection (AR) treatment to form an antireflection layer, and the other face of the base material layer was subjected to an easy adhesion treatment; and light-transmissive portions and light-absorbing portions (an optical functional layer) were formed on the face of the base material layer subjected to the easy-adhesion treatment. Further, a belt-like functional electromagnetic shielding sheet was obtained, the belt-like functional electromagnetic shielding sheet comprising: an electromagnetic shielding layer in which one face of the base material layer (manufactured by Toyobo Co., Ltd.; PET sheet; A4300; thickness 100 μm) was subjected to rework adhesion processing (was provided with a peelable adhesive layer), and the other face was provided with a metal mesh layer; an adhesive layer which has a wavelength-filtering function and is formed on the metal mesh layer side of the electromagnetic shielding layer in an intermittent pattern (hereinafter, this adhesive layer being referred to as a "wavelength filter adhesive layer"); and a release film laminated on the wavelength filter adhesive layer. Then the belt-like functional electromagnetic shielding sheet was rolled up to obtain a sheet roll. Next, while peeling the release film off the sheet roll of the above mentioned functional electromagnetic shielding sheet, the above belt-like optical sheet and the functional electromagnetic shielding layer were continuously adhered to each other in a roll-to-roll way such that the face on the optical functional layer side of the belt-like optical sheet and the wavelength filter adhesive layer of the functional electromagnetic shielding sheet face each other; thereby an optical sheet roll was obtained. Furthermore, an optical sheet was obtained by cutting it out from the optical sheet roll into a size that it can be adhered to a 46 inch-sized image source. At this point, the optical sheet was cut out such that the long side of the rectangular optical sheet is parallel to the longitudinal direction of the belt-like optical sheet. A layer constitution of the optical sheet according to Example 3 is as shown in FIG. 11. In FIG. 11, the same constituents as those in the figures shown above are given the same numerical references. Also, in FIG. 11, the numeral 31' denotes the wavelength filter adhesive layer; the numeral 35 denotes the peelable adhesive layer.

Example 4

First, the following were prepared: an optical sheet roll produced in the same manner as in Example 1; an AR roll formed by rolling up an AR sheet in which one face of the base material layer (manufactured by Toyobo Co., Ltd.; PET sheet; A4300; thickness 100 μm) was subjected to an antireflection (AR) treatment to form an antireflection layer and the other face of the base material layer was subjected to an easy adhesion treatment; and an adhesive roll formed by rolling up an adhesive sheet comprising a heavy-peel separator on one face of the adhesive layer and a light-peel separator on the other face. The heavy-peel separator refers to a release sheet having a peel strength heavier than that of the light-peel separator; and the light-peel separator refers to a release sheet having a peel strength lighter than that of the heavy-peel separator.

Next, while pulling out the AR sheet from the AR roll, the adhesive sheet was pulled from the adhesive roll and the light-peel separator of the adhesive sheet was peeled. Then the face of the AR sheet subjected to the easy adhesion treatment was adhered to the adhesive layer of the adhesive sheet, thereby producing an AR sheet roll provided with an adhesive layer. Next, while peeling the heavy-peel separator of the AR sheet roll, the adhesive layer was adhered onto the face on the base material layer side of the optical sheet roll, thereby obtaining a wind-up roll.

Figure 12:
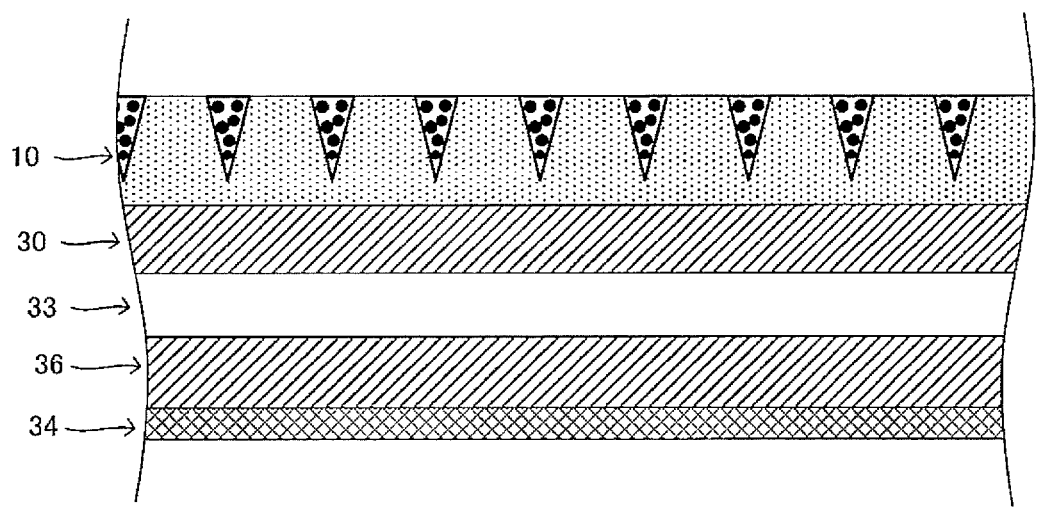
FIG. 12 is a schematic view of a cross section of a winding roll according to Example 4.

Specifically, as shown in FIG. 12, the wind-up roll produced in Example 4 comprises: an antireflection layer 34, a base material layer 36, an adhesive layer 33, a base material layer 30, and an optical functional layer 10, which were stacked in the mentioned order.

Example 5

A belt-like functional electromagnetic shielding sheet was obtained in the same manner as in Example 3; and this was rolled up to obtain a sheet roll. After that, the wind-up roll obtained in Example 4 and the functional electromagnetic shielding sheet were continuously adhered to each other in the roll-to-roll way, such that the optical functional layer of the wind-up roll and the wavelength filter adhesive layer of the functional electromagnetic shielding sheet face each other; thereby a belt-like optical sheet was obtained. Furthermore, an optical sheet was obtained by cutting it out from the belt-like optical sheet into a size that it can be adhered to a 46 inch-sized image source. At this point, the optical sheet was cut out such that the long side of the rectangular optical sheet is parallel to the longitudinal direction of the belt-like optical sheet.

Figure 13:
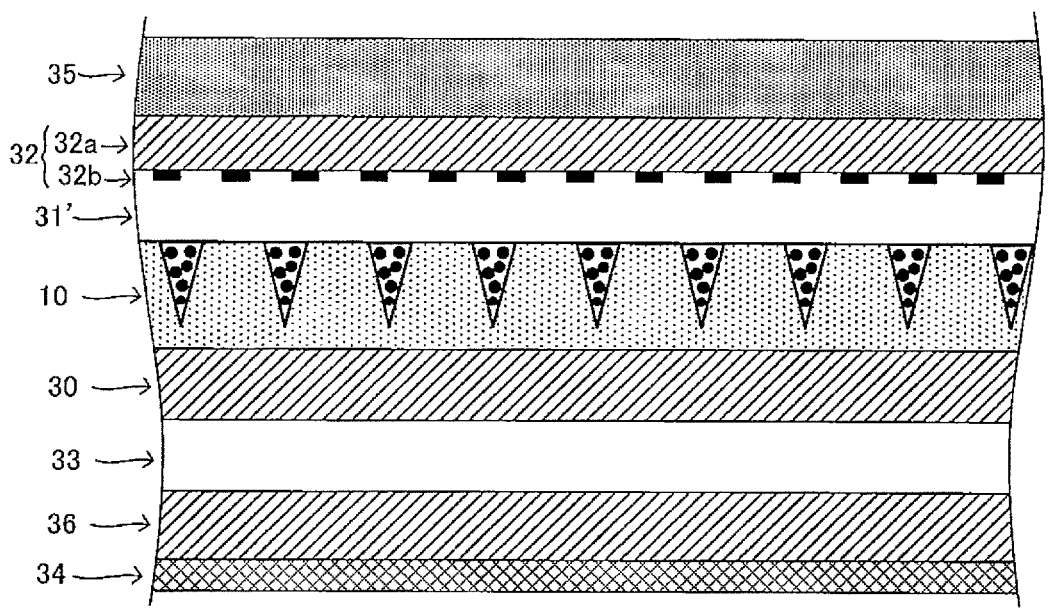
FIG. 13 is a schematic view of a cross section of an optical sheet according to Example 5.

Specifically, as shown in FIG. 13, the optical sheet produced in Example 5 comprises: an antireflection layer 34; a base material layer 36; an adhesive layer 33; a base material layer 30; an optical functional layer 10; a wavelength filter adhesive layer 31'; an electromagnetic shielding layer 32 having a metal mesh layer 32b formed on a base material layer 32a; and a peelable adhesive layer 35, which were stacked in the mentioned order.

Comparative Examples 1 to 3

When producing the optical sheet rolls of Examples 1 to 3, they were produced in such a manner that the longitudinal direction of the light-absorbing portions is not oblique with respect to the longitudinal direction of the base material layer; therefore, a longer width of the base material was needed. In a case equivalent to Example 1, the rate of material losses caused by the cutting process decreased by 8%; in a case equivalent to Example 2, the rate decreased by 5%; and in a case equivalent to Example 3, the rate decreased by 10%.

DESCRIPTION OF THE REFERENCE NUMERALS 1 optical sheet roll
10 optical functional layer
11 light-transmissive portion
12 groove
13 light-absorbing portion
14 binder portion
15 light-absorbing particle
20 mold roll
21 recess portion
22 protrusion portion
30 base material layer (base material)
40 belt-like optical sheet
50 optical sheet

The invention claimed is:
1. A method for manufacturing an optical sheet comprising a base material layer, and an optical functional layer which has light-transmissive portions capable of transmitting light and formed in a row along a surface of the base material layer, and which has grooves arranged between the light-transmissive portions,
wherein the method comprises the steps of forming the light-transmissive portions on one surface side of the base material layer and of rolling up a belt like optical sheet comprising the base material layer and the optical functional layer;

forming the light-transmissive portions by filling a spiral-shaped groove(s) with a resin, the spiral-shaped groove(s) formed on the outer circumferential surface of a cylinder mold roll and having a longitudinal direction inclined at an angle with respect to the circumferential direction; and removing the resin from the cylinder mold roll after the resin is cured, so that a longitudinal direction of the grooves arranged between the light-transmissive portions is oblique at an angle of 0.5° or more and 10° or less with respect to the longitudinal direction of the belt-like optical sheet;

the method comprises the step of forming light-absorbing portions by providing a black resin ink containing light-absorbing particles whose average particle diameter is 1 μm or more and a binder made of a resin in which the light-absorbing particles are dispersed, filling the grooves with the black resin ink while scraping off an excess of the black resin ink with a doctor blade, and curing the binder; and the method comprises the steps of manufacturing an optical sheet roll formed by rolling up the belt-like optical sheet, and cutting out from the belt-like optical sheet provided to the optical sheet roll, an optical sheet in a square shape having a side parallel to the longitudinal direction of the belt-like optical sheet.

2. The method for manufacturing an optical sheet roll according to claim 1, the method comprising the step of forming an antireflection layer or an anti-glare layer on an outermost layer.

3. The method for manufacturing an optical sheet according to claim 1, the method comprising the step of forming a wavelength filter layer having a function of preventing transmission of a light with a predetermined wavelength.

4. The method for manufacturing an optical sheet according to claim 1, the method comprising the step of forming an electromagnetic wave shielding layer having a function of blocking electromagnetic waves.

5. A method for manufacturing a display device comprising an image light source and an optical sheet disposed on an observer side of the image light source, the method comprising the steps of:

manufacturing the optical sheet by the method of manufacturing an optical sheet according to claim 1; and disposing the optical sheet on the observer side of the image light source.

* * * * *